US008477707B2

(12) United States Patent
Fischer

(10) Patent No.: US 8,477,707 B2
(45) Date of Patent: Jul. 2, 2013

(54) POINT TO POINT RADIO BEARERS FOR A BROADCASTING SERVICE

(75) Inventor: Patrick Fischer, Bourg la Reine (FR)

(73) Assignee: LG Electronics Inc., Seoul (KR)

( * ) Notice: Subject to any disclaimer, the term of this patent is extended or adjusted under 35 U.S.C. 154(b) by 109 days.

(21) Appl. No.: 13/162,287

(22) Filed: Jun. 16, 2011

(65) Prior Publication Data

US 2011/0249608 A1    Oct. 13, 2011

Related U.S. Application Data

(63) Continuation of application No. 11/782,505, filed on Jul. 24, 2007, now Pat. No. 7,986,664.

(60) Provisional application No. 60/833,187, filed on Jul. 24, 2006.

(51) Int. Cl.
*H04W 4/00* (2009.01)
*H04B 7/216* (2006.01)
*H04J 1/00* (2006.01)
*H04J 3/00* (2006.01)

(52) U.S. Cl.
USPC ............ 370/329; 370/342; 370/343; 370/345

(58) Field of Classification Search
USPC ....... 370/328–330, 345–347; 455/434–435.3, 455/507–512
See application file for complete search history.

(56) References Cited

U.S. PATENT DOCUMENTS 7,395,076 B2    7/2008  Kim et al.
7,801,480 B2    9/2010  Becker
2004/0087319 A1    5/2004  Bos et al.
2004/0185837 A1    9/2004  Kim et al.
2004/0253959 A1    12/2004  Hwang et al.
2005/0037768 A1    2/2005  Hwang et al.
2005/0083913 A1    4/2005  Choi et al.
2006/0128433 A1    6/2006  Liang et al.
2008/0279257 A1    11/2008  Vujcic et al.

FOREIGN PATENT DOCUMENTS

| CN | 1476198 | 2/2004 |
|---|---|---|
| JP | 2005051351 | 2/2005 |
| JP | 2007510356 | 4/2007 |
| JP | 2008512038 | 4/2008 |
| KR | 10-2005-0014220 | 2/2005 |
| RU | 2275742 | 4/2006 |
| WO | 2005/039186 | 4/2005 |
| WO | 2005/046087 | 5/2005 |

(Continued)

OTHER PUBLICATIONS

Samsung et al., "MBMS Session based counting, remaining issues," R2-050828, 3GPP TSG-RAN2 Meeting #46 bis, Apr. 2005, XP-050128082.

(Continued)

*Primary Examiner* — Thai Hoang
(74) *Attorney, Agent, or Firm* — Lee, Hong, Degerman, Kang & Waimey

(57) ABSTRACT

A method for establishing a connection between user equipment (UE) and an associated network includes receiving at the UE a service announcement providing a description of an available broadcast service and at least one identifier which identifies the broadcast service, and receiving at the UE a setup message which establishes a point-to-point radio bearer between the UE and the network, such that the setup message includes the identifier which is used to identify that the radio bearer carriers the broadcast service.

8 Claims, 15 Drawing Sheets

FOREIGN PATENT DOCUMENTS

| WO | 2005/064822 | 7/2005 |
|---|---|---|
| WO | 2006/019244 | 2/2006 |
| WO | 2006/031055 | 3/2006 |
| WO | 2006/031069 | 3/2006 |
| WO | 2006/034660 | 4/2006 |
| WO | 2006/104346 | 10/2006 |

OTHER PUBLICATIONS

3rd Generation Partnership Project (3GPP), 3GPP TS 25.331, V6.5.0, Mar. 2005.

3rd Generation Partnership Project (3GPP), "Technical Specification Group Radio Access Network; Introduction of the Multimedia Broadcast Multicast Service (MBMS) in the Radio Access Network (RAN); Stage 2 (Release 6)," 3GPP TS 25.346, V6.8.0, Jun. 2006.

Vodafone Group, "MBMS and Mobile TV," R2-061487, 3GPP TSG RAN WG2 #52, May 2006.

Release 7, 3GPP TS 25.331 V7.0.0, Mar. 2006.

United States Patent and Trademark Office Application U.S. Appl. No. 13/112,970, Notice of Allowance dated Mar. 6, 2013, 9 pages.

Logical channels mapped onto transport channels, seen from the UE side
PRIOR ART Logical channels mapped onto transport channels, seen from the UTRAN side
PRIOR ART UE State Transitions
PRIOR ART

| NSAPI IEI | | | | | octet 1 |
|---|---|---|---|---|---|
| 0 | 0 | 0 | 0 | NSAPI value | octet 2 |
| | Spare | | | | |

FIG. 12

| Enhanced NSAPI IEI | octet 1 |
|---|---|
| Enhanced NSAPI Value | octet 2 |

FIG. 13

| Temporary Mobile Group Identity IEI | | Octet 1 |
|---|---|---|
| Length of Temporary Mobile Group Identity contents | | Octet 2 |
| MBMS Service ID | | Octet 3<br>Octet 4<br>Octet 5 |
| MCC digit 2 | MCC digit 1 | Octet 6 |
| MNC digit 3 | MCC digit 3 | Octet 7 |
| MNC digit 2 | MNC digit 1 | Octet 8 |

POINT TO POINT RADIO BEARERS FOR A BROADCASTING SERVICE

CROSS-REFERENCE TO RELATED APPLICATIONS

This application is a continuation of U.S. application Ser. No. 11/782,505 filed on Jul. 24, 2007, now U.S. Pat. No. 7,986,664, which pursuant to 35 U.S.C. §119(e), claims the benefit of provisional patent application Ser. No. 60/833,187, filed Jul. 24, 2006, the contents of which are hereby incorporated by reference herein in their entirety.

BACKGROUND OF THE INVENTION

1. Field of the Invention

The present invention relates generally to wireless communication systems, and in particular to establishing a connection between user equipment and an associated network.

2. Discussion of the Related Art

A universal mobile telecommunication system (UMTS) is a European-type, third generation IMT-2000 mobile communication system that has evolved from a European standard known as global system for mobile communications (GSM). UMTS is intended to provide an improved mobile communication service based upon a GSM core network and wideband code division multiple access (W-CDMA) wireless connection technology.

In December 1998, a Third Generation Partnership Project (3GPP) was formed by the ETSI of Europe, the ARIB/TTC of Japan, the T1 of the United States, and the TTA of Korea. The 3GPP creates detailed specifications of UMTS technology. In order to achieve rapid and efficient technical development of the UMTS, five technical specification groups (TSG) have been created within the 3GPP for standardizing the UMTS by considering the independent nature of the network elements and their operations.

Each TSG develops, approves, and manages the standard specification within a related region. Among these groups, the radio access network (RAN) group (TSG-RAN) develops the standards for the functions, requirements, and interface of the UMTS terrestrial radio access network (UTRAN), which is a new radio access network for supporting W-CDMA access technology in the UMTS.

FIG. 1 gives an overview of the UMTS network, including the UE, the UTRAN and the core network. The UTRAN is composed of several radio network controllers (RNCs) and Node-Bs, which communicate via the Iub interface.

Each RNC controls several Node-Bs. Each RNC is connected via the $I_u$ interface to the core network (CN), specifically to the MSC (mobile-services switching center) and the SGSN (serving GPRS support node) of the CN. RNCs can be connected to other RNCs via the $I_{ur}$ interface. The RNC handles the assignment and management of radio resources and operates as an access point with respect to the core network.

The Node-Bs receive information sent by the physical layer of the terminal through an uplink transmission and transmit data to the terminal through a downlink transmission. The Node-Bs operate as access points of the UTRAN for the terminal.

The SGSN is connected via the $G_f$ interface to the EIR (equipment identity register), via the $G_S$ interface to the MSC, via the $G_N$ interface to the GGSN (gateway GPRS support node) and via the $G_R$ interface to the HSS (home subscriber server). The EIR maintains lists of mobiles that are allowed to be used on the network.

The MSC, which controls the connection for circuit switch (CS) services. The MSC is connected to the MGW (media gateway) via the $N_B$ interface, to the EIR via the F interface, and to the HSS via the D interface. The MGW is connected to the HSS via the C interface and to the PSTN (Public Switched Telephone Network). The MGW facilitates adapting the codecs between the PSTN and the connected RAN.

The GGSN is connected to the HSS via the $G_C$ interface, and to the Internet via the $G_I$ interface. The GGSN is responsible for routing, charging, and separation of data flows into different radio access bearers (RABs). The HSS handles the subscription data of the users.

The UTRAN constructs and maintains a radio access bearer (RAB) for communication between the terminal and the core network. The core network requests end-to-end quality of service (QoS) requirements from the RAB, and the RAB supports the QoS requirements set by the core network. Accordingly, the UTRAN can satisfy the end-to-end QoS requirements by constructing and maintaining the RAB.

The services provided to a specific terminal are roughly divided into circuit switched services and packet switched services. For example, a general voice conversation service is a circuit switched service, while a Web browsing service via an Internet connection is classified as a packet switched service.

For supporting circuit switched services, the RNCs are connected to the mobile switching center (MSC) of the core network, and the MSC is connected to the gateway mobile switching center (GMSC) which manages the connection with other networks. For supporting packet switched services, the RNCs are connected to the serving general packet radio service (GPRS) support node (SGSN), and the gateway GPRS support node (GGSN) of the core network. The SGSN supports the packet communications with the RNCs, and the GGSN manages the connection with other packet switched networks, such as the Internet.

FIG. 2 illustrates a structure of a radio interface protocol between the terminal and the UTRAN according to the 3GPP radio access network standards. As shown in FIG. 2, the radio interface protocol has vertical layers comprising a physical layer, a data link layer, and a network layer, and has horizontal planes comprising a user plane (U-plane) for transmitting user data and a control plane (C-plane) for transmitting control information.

The user plane is a region that handles traffic information with the user, such as voice or Internet protocol (IP) packets. The control plane is a region that handles control information for an interface with a network, maintenance and management of a call, and the like.

The protocol layers in FIG. 2 can be divided into a first layer (L1), a second layer (L2), and a third layer (L3) based on the three lower layers of an open system interconnection (OSI) standard model. The first layer (L1), or the physical layer, provides an information transfer service to an upper layer by using various radio transmission techniques. The physical layer is connected to an upper layer, called a medium access control (MAC) layer, via a transport channel.

The MAC layer and the physical layer exchange data via the transport channel. The second layer (L2) includes a MAC layer, a radio link control (RLC) layer, a broadcast/multicast control (BMC) layer, and a packet data convergence protocol (PDCP) layer.

The MAC layer handles mapping between logical channels and transport channels, and provides allocation of the MAC parameters for allocation and re-allocation of radio resources. The MAC layer is connected to an upper layer, called the radio link control (RLC) layer, via a logical channel.

Various logical channels are provided according to the type of information transmitted. In general, a control channel is used to transmit information of the control plane, and a traffic channel is used to transmit information of the user plane.

A logical channel may be a common channel or a dedicated channel depending on whether the logical channel is shared. Logical channels include a dedicated traffic channel (DTCH), a dedicated control channel (DCCH), a common traffic channel (CTCH), a common control channel (CCCH), a broadcast control channel (BCCH), and a paging control channel (PCCH) or a shared channel control channel.

The BCCH provides information including information utilized by a terminal to access a system. The PCCH is used by the UTRAN to access a terminal.

For the purposes of a multimedia broadcast/multicast service (MBMS) additional traffic and control channels are introduced in the MBMS standard. The MCCH (MBMS point-to-multipoint control channel) is used for transmission of MBMS control information. The MTCH (MBMS point-to-multipoint traffic channel) is used for transmitting MBMS service data. The MSCH (MBMS Scheduling Channel) is used to transmit scheduling information. The different logical channels that exist are listed in FIG. 3.

The MAC layer is connected to the physical layer by transport channels and can be divided into a MAC-b sub-layer, a MAC-d sub-layer, a MAC-c/sh sub-layer, a MAC-hs sub-layer and a MAC-m sublayer according to the type of transport channel being managed. The MAC-b sub-layer manages a BCH (broadcast channel), which is a transport channel handling the broadcasting of system information. The MAC-c/sh sub-layer manages a common transport channel, such as a forward access channel (FACH) or a downlink shared channel (DSCH), which is shared by a plurality of terminals, or in the uplink the radio access channel (RACH). The MAC-m sublayer may handle the MBMS data.

The possible mapping between the logical channels and the transport channels from a UE perspective is given in FIG. 4. The possible mapping between the logical channels and the transport channels from a UTRAN perspective is given in FIG. 5.

The MAC-d sub-layer manages a dedicated channel (DCH), which is a dedicated transport channel for a specific terminal. The MAC-d sublayer is located in a serving RNC (SRNC) that manages a corresponding terminal. One MAC-d sublayer also exists in each terminal.

The RLC layer, depending of the RLC mode of operation, supports reliable data transmissions and performs segmentation and concatenation on a plurality of RLC service data units (SDUs) delivered from an upper layer. When the RLC layer receives the RLC SDUs from the upper layer, the RLC layer adjusts the size of each RLC SDU in an appropriate manner based upon processing capacity and then creates data units by adding header information thereto. The data units, called protocol data units (PDUs), are transferred to the MAC layer via a logical channel. The RLC layer includes a RLC buffer for storing the RLC SDUs and/or the RLC PDUs.

The BMC layer schedules a cell broadcast (CB) message transferred from the core network and broadcasts the CB message to terminals positioned in a specific cell or cells.

The PDCP layer is located above the RLC layer. The PDCP layer is used to transmit network protocol data, such as the IPv4 or IPv6, effectively on a radio interface with a relatively small bandwidth. For this purpose, the PDCP layer reduces unnecessary control information used in a wired network, a function called header compression.

The radio resource control (RRC) layer located at the lowest portion of the third layer (L3) is only defined in the control plane. The RRC layer controls the transport channels and the physical channels in relation to setup, reconfiguration, and the release or cancellation of the radio bearers (RBs). Additionally the RRC handles user mobility within the RAN and additional services, such as location services.

The RB signifies a service provided by the second layer (L2) for data transmission between the terminal and the UTRAN. In general, the set up of the RB refers to the process of stipulating the characteristics of a protocol layer and a channel required for providing a specific data service, and setting the respective detailed parameters and operation methods.

The different possibilities that exist for the mapping between the radio bearers and the transport channels for a given UE are not all possible all the time. The UE and UTRAN deduce the possible mapping depending on the UE state and the procedure that the UE and UTRAN are executing. The different states and modes are explained in more detail below, as far as they concern the present invention.

The different transport channels are mapped onto different physical channels. For example, the RACH transport channel is mapped on a given PRACH, the DCH can be mapped on the DPCH, the FACH and the PCH can be mapped on the S-CCPCH, and the DSCH is mapped on the PDSCH. The configuration of the physical channels is given by RRC signaling exchange between the RNC and the UE.

The RRC mode refers to whether there exists a logical connection between the RRC of the terminal and the RRC of the UTRAN. If there is a connection, the terminal is said to be in RRC connected mode. If there is no connection, the terminal is said to be in idle mode.

Because an RRC connection exists for terminals in RRC connected mode, the UTRAN can determine the existence of a particular terminal within the unit of cells. For example, the UTRAN can determine in which cell or set of cells an RRC connected mode terminal is located and to which physical channel the UE is listening. Thus, the terminal can be effectively controlled.

In contrast, the UTRAN cannot determine the existence of a terminal in idle mode. The existence of idle mode terminals can only be determined by the core network to be within a region that is larger than a cell, for example, a location or a routing area. Therefore, the existence of idle mode terminals is determined within large regions, and in order to receive mobile communication services such as voice or data, the idle mode terminal must move or change into the RRC connected mode. The possible transitions between modes and states are shown in FIG. 6.

A UE in RRC connected mode can be in different states, such as CELL_FACH state, CELL_PCH state, CELL_DCH state, or URA_PCH state. Depending on the state, the UE carries out different actions and listens to different channels.

For example, a UE in CELL_DCH state will try to listen to DCH type of transport channels, among others. DCH types of transport channels include DTCH and DCCH transport channels, which can be mapped to a certain DPCH, DPDSCH or other physical channels.

The UE in CELL_FACH state will listen to several FACH transport channels, which are mapped to a certain S-CCPCH. A UE in PCH state will listen to the PICH channel and the PCH channel, which are mapped to a certain S-CCPCH physical channel.

The main system information is sent on the BCCH logical channel which is mapped on the P-CCPCH (primary common control physical channel). Specific system information blocks can be sent on the FACH channel. When the system information is sent on FACH, the UE receives the configuration of the FACH either on the BCCH that is received on P-CCPCH or on a dedicated channel. When system information is sent on the BCCH (i.e., via the P-CCPCH), then in each frame or set of two frames the SFN (system frame number) is sent which is used in order to share the same timing reference between the UE and the Node-B. The P-CCPCH is sent using the same scrambling code as the P-CPICH (primary common pilot channel), which is the primary scrambling code of the cell. The spreading code that is used by the P-CCPCH is of a fixed SF (spreading factor) 256, and the number is one. The UE knows about the primary scrambling code either by information sent from the network on system information of neighboring cells that the UE has read, by messages that the UE has received on the DCCH channel, or by searching for the P-CPICH, which is sent using the fixed SF 256, the spreading code number 0 and which transmits a fixed pattern.

The system information comprises information on neighboring cells, configuration of the RACH and FACH transport channels, and the configuration of MICH and MCCH which are channels that are dedicated channels for the MBMS service.

Each time the UE changes the cell it is camping (in idle mode) or when the UE has selected the cell (in CELL_FACH, CELL_PCH or URA_PCH) state, the UE verifies that it has valid system information. The system information is organized in SIBs (system information blocks), a MIB (master information block) and scheduling blocks. The MIB is sent very frequently and gives timing information of the scheduling blocks and the different SIBs. For SIBs that are linked to a value tag, the MIB also contains information on the last version of a part of the SIBs. SIBs that are not linked to a value tag are linked to an expiration timer. SIBs linked to an expiration timer become invalid and need to be reread if the time of the last reading of the SIB is larger than this timer value. SIBs linked to a value tag are only valid if they have the same value tag as the one broadcast in the MIB. Each block has an area scope of validity (cell, PLMN, equivalent PLMN) which signifies on which cells the SIB is valid. A SIB with area scope "cell" is valid only for the cell in which it has been read. A SIB with area scope "PLMN" is valid in the whole PLMN, a SIB with the area scope "equivalent PLMN" is valid in the whole PLMN and equivalent PLMN.

In general UEs read the system information when they are in idle mode, CELL_FACH state, CELL_PCH state or in URA_PCH state of the cells that they have selected or the cell that they are camping on. In the system information, they receive information on neighboring cells on the same frequency, different frequencies and different RAT (radio access technologies). This allows the UE to know which cells are candidates for cell reselection.

MBMS is introduced in the UMTS standard in the Release 6 of the specification (Rel-6). It describes techniques for optimized transmission of MBMS bearer service including point-to-multipoint transmission, selective combining and transmission mode selection between point-to-multipoint and point-to-point bearers. This is used in order to save radio resources when the same content is sent to multiple users, and enables TV-like services. MBMS data can be split into two categories, control plane information and user plane information. The control plane information contains information on the physical layer configuration, transport channel configuration, radio bearer configuration, ongoing services, counting information, scheduling information, and the like. In order to allow UEs to receive this information, MBMS bearer specific control information for the MBMS is sent to the UEs.

The user plane data of MBMS bearers can be mapped onto dedicated transport channels for a point-to-point service which is sent only to one UE, or on a shared transport channel for point to multipoint service which is transmitted to (and received by) several users at the same time.

Point-to-point transmission is used to transfer MBMS specific control/user plane information, as well as dedicated control/user plane information between the network and a UE in RRC connected mode. It is used for the multicast or the broadcast mode of MBMS. DTCH is used for a UE in CELL_FACH and Cell_DCH. This allows existing mappings to transport channels.

To allow cell resources to be used in an optimized manner, a function called counting has been introduced in MBMS applications. The counting procedure is used to determine how many UEs are interested in the reception of a given service. This is done by using the counting procedure shown in FIG. 7.

For example, a UE that is interested in a certain service receives information of the availability of a MBMS service. The network can inform the UE that it should indicate to the network its interest in the service in the same way such as by transmitting the "access information" on the MCCH channel. A probability factor included in the access information message determines that an interested UE will only respond with a given probability. In order to inform the network that the UE is interested in a given service, the UE will send to the network the RRC connection setup message or the cell update message in the cell that the UE has received the counting information. This message may potentially include an identifier indicating the service that the UE is interested in.

Point-to-multipoint transmission is used to transfer MBMS specific control/user plane information between the network and several UEs in RRC connected or idle mode. It is used for broadcast or multicast mode of MBMS.

In the case that the network operates on several frequencies, when a UE is camping on one frequency, and a MBMS service is transmitted on a different frequency, a UE may not be aware of the fact that a MBMS service is transmitted in the different frequency. Therefore the frequency convergence procedure allows the UE to receive information in frequency A that indicates in a frequency B that a given service is available.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In accordance with an embodiment, a method for establishing a connection between user equipment (UE) and an associated network includes receiving at the UE a notification indicating either a start of a broadcast service or an availability of the broadcast service, such that the notification comprises an identifier which identifies the broadcast service. The method further includes receiving at the UE a setup message which establishes a point-to-point radio bearer between the UE and the network, such that the setup message includes the identifier which is used to identify that the radio bearer carriers the broadcast service.

One feature includes sending a request message to the network identifying the broadcast service for the UE.

Another feature includes establishing or maintaining a signaling connection between the UE and the network.

Yet another feature includes sending a setup confirmation message to the network to confirm establishment of the broadcast service.

Still yet another feature includes the notification includes at least one of a MODIFIED SERVICES INFORMATION message and an UNMODIFIED SERVICES INFORMATION message.

According to one aspect, the broadcast service is a multimedia broadcast/multicast service (MBMS).

According to another aspect the user equipment (UE) and the network are configured to operate within a universal mobile telecommunications system (UMTS).

According to yet another aspect, the request message includes a message selected from the group consisting of a cell update message, a RRC connection request message, and a multimedia broadcast/multicast service (MBMS) modified service request message.

According to still yet another aspect, the notification includes a version of service information having the identifier, and the method further includes creating at least one short transmission data, such that the at least one short transmission data references the identifier, and transmitting a request message to the network, such that the request message comprises the at least one short transmission data along with version information associated with the version of the service information, such that the short transmission data identifies the broadcast service.

One feature includes determining the version of the service information using a timing reference associated with the service information.

According to one aspect the timing reference is determined based upon a system frame number associated with the service information.

According to another aspect the service information includes a list of service identifiers arranged by appending service identifiers received in unmodified services information to service identifiers received in modified services information.

According to yet another aspect the at least one short transmission identifier corresponds to a location of the at least one service identifier within the list of service identifiers.

According to still yet another aspect the identifier includes a temporary mobile group identifier (TMGI).

In accordance with an alternative embodiment, a method for establishing a connection between user equipment (UE) and an associated network includes transmitting to the UE a notification indicating either a start of a broadcast service or an availability of the broadcast service, such that the notification includes an identifier which identifies the broadcast service, and transmitting to the UE a setup message which establishes a point-to-point radio bearer between the UE and the network, such that the setup message comprises the identifier which is used to identify that the radio bearer carriers the broadcast service.

In accordance with another alternative embodiment, a method for establishing a connection between user equipment (UE) and an associated network includes receiving at the UE a service announcement providing a description of an available broadcast service and at least one identifier which identifies the broadcast service, and receiving at the UE a setup message which establishes a point-to-point radio bearer between the UE and the network, such that the setup message comprises the identifier which is used to identify that the radio bearer carriers the broadcast service.

In accordance with still yet another embodiment, a method for transmitting a service identifier from user equipment (UE) to an associated network includes receiving at the UE a version of service information, the service information includes at least one service identifier, creating at least one short transmission identifier, such that the at least one short transmission identifier references at least one service identifier of the service information, and transmitting the at least one short transmission identifier to the network along with version information associated with the version of the service information.

In accordance with one embodiment, a method for decoding a short transmission identifier in a network includes transmitting to the UE a version of service information, the service information includes at least one service identifier, receiving at least one short transmission identifier and version information at the network, such that the at least one short transmission identifier references at least one service identifier of the service information, and such that the version information is associated with the version of the service information, decoding the least one short transmission identifier based upon and the version information to identify the at least one service identifier.

These and other embodiments will also become readily apparent to those skilled in the art from the following detailed description of the embodiments having reference to the attached figures, the invention not being limited to any particular embodiment disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments. In the drawings:

FIG. 12 depicts an example of a typical network service access point identifier (NSAPI);

FIG. 13 depicts an example of a typical enhanced NSAPI, which is commonly used in MBMS;

FIG. 14 depicts an example of a typical temporary mobile group identity (TMGI);

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or similar parts.

Embodiments of the present invention include various techniques for linking a MBMS bearer service to a PtP radio bearer. This allows, among other things, the UE to receive a dedicated bearer carrying a MBMS service without the need to join the service beforehand. A network operating in accordance with the 3GPP standards, for example, provides multimedia broadcast multicast service (MBMS). This service has been implemented relatively recently, an example of which is described in Release 6 of the 3GPP standards. The 3GPP TSG SA (Service and System Aspect) describes various network components and associated functions for supporting MBMS services. A typical Release 99 cell broadcast service is limited to broadcasts relating to text-based messaging. The MBMS service of Release 6 is more advanced in that the network multicasts multimedia data to terminals (e.g., UEs) that have subscribed to the corresponding service. Broadcasting of multimedia data is also possible.

In general, the MBMS service is a downward-dedicated service that provides a streaming or background service to a plurality of terminals using a common or dedicated downward channel. The MBMS service may be generally divided into a broadcast mode and a multicast mode.

MBMS broadcast mode may be used to transmit multimedia data to users located within the broadcast area, while MBMS multicast mode transmits multimedia data to a specific user group located within the multicast area. The broadcast area relates to an area in which the broadcast service is available, and the multicast area relates to an area in which the multicast service is available.

Figure 1:
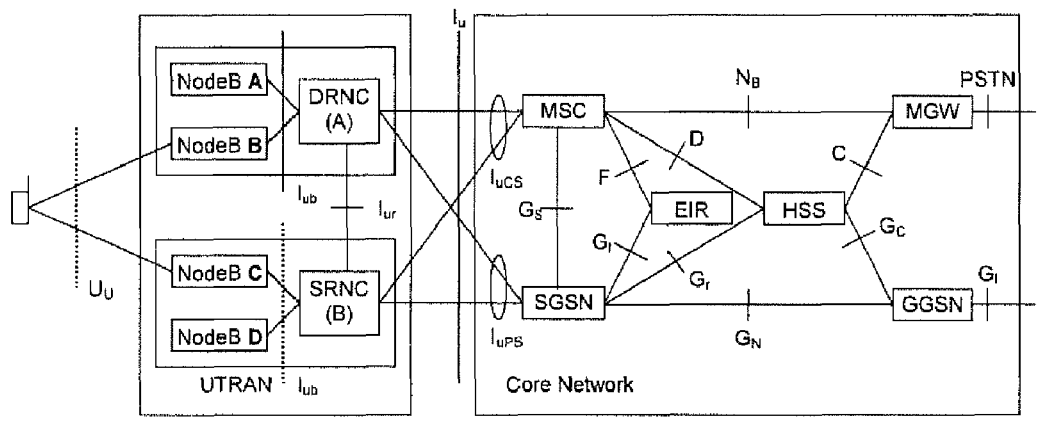
FIG. 1 illustrates a conventional UMTS network.
Figure 2:
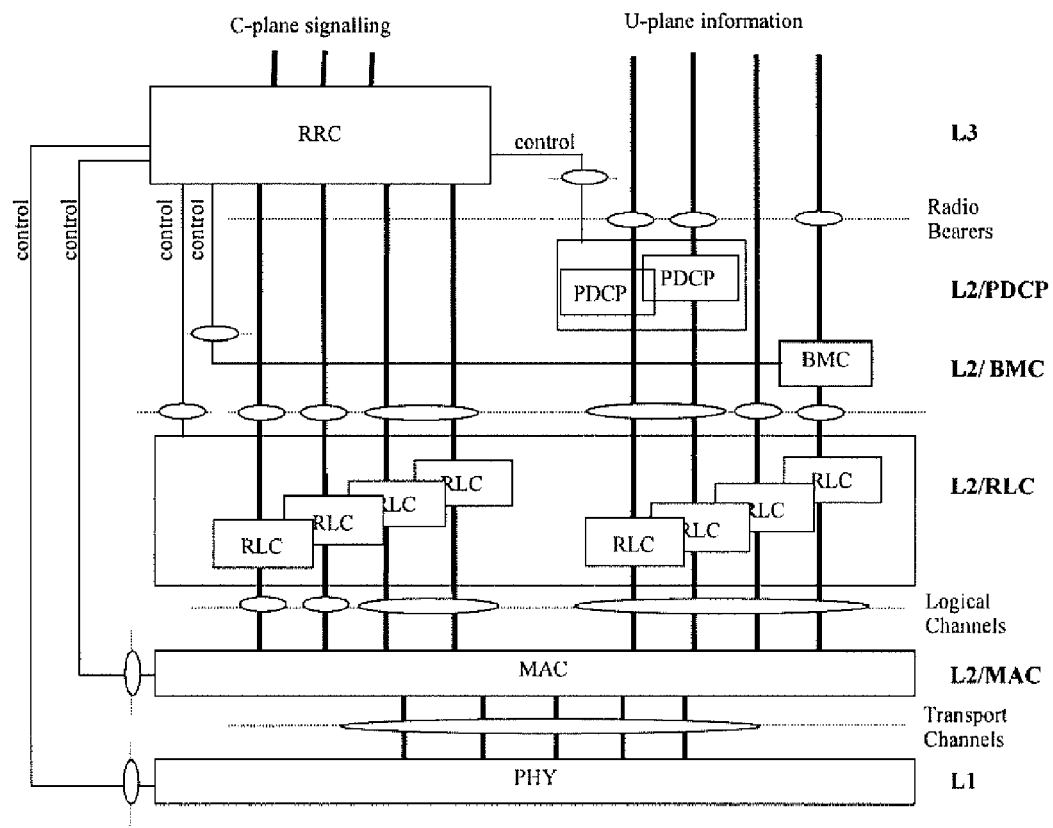
FIG. 2 illustrates a conventional radio interface protocol between a UE and UTRAN.
Figure 3:
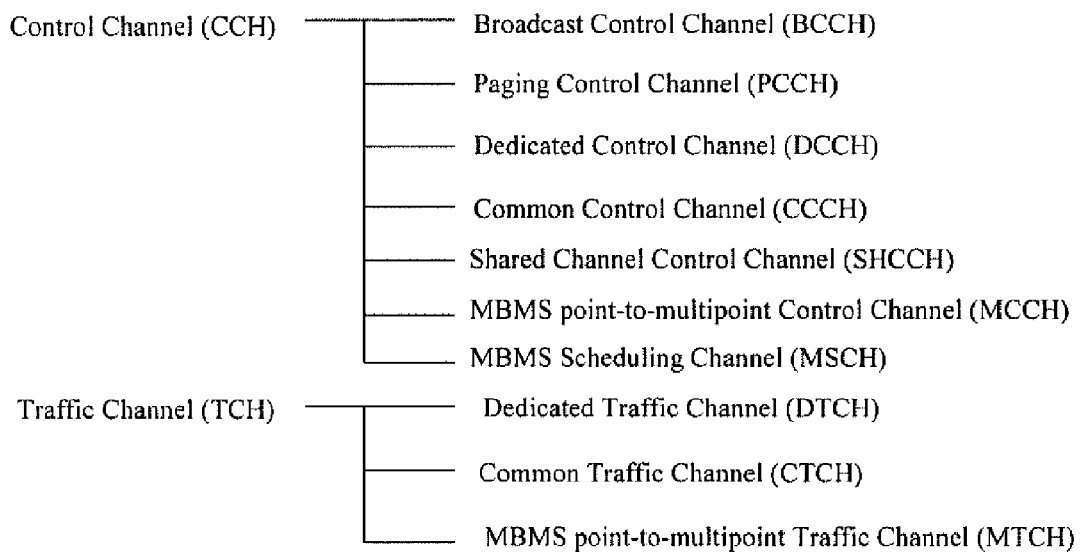
FIG. 3 illustrates a logical channel structure.
Figure 4:
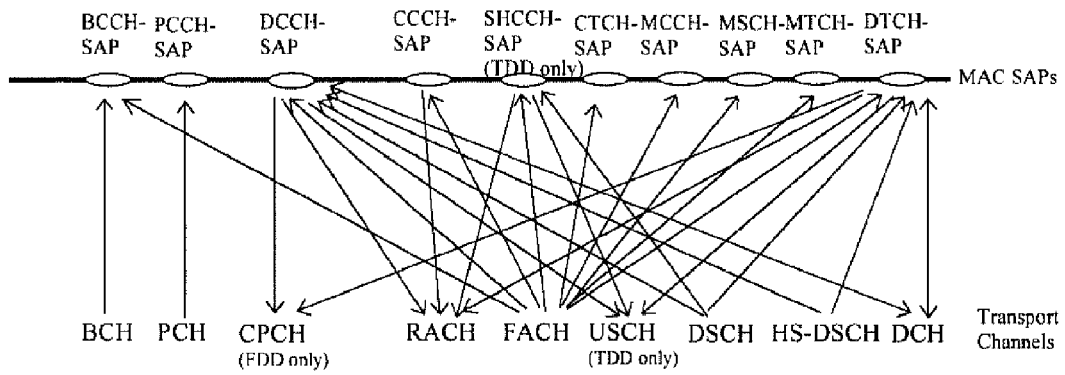
FIG. 4 illustrates possible mappings between logical channels and transport channels from the UE perspective.
Figure 5:
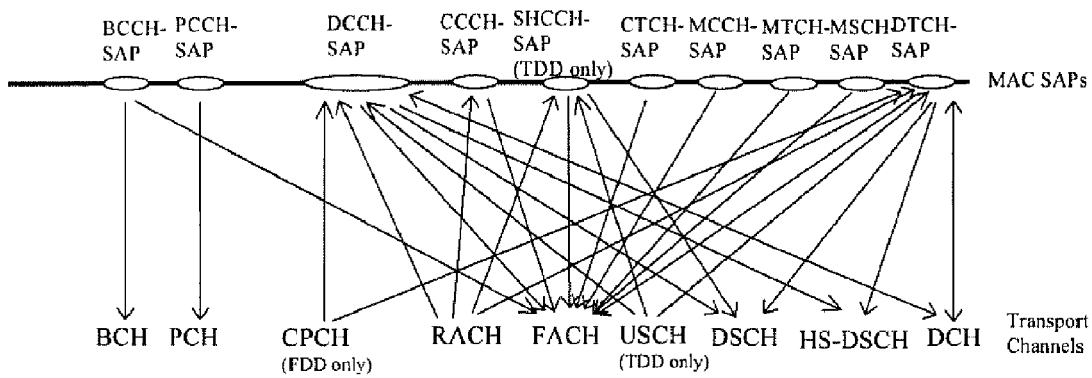
FIG. 5 illustrates possible mappings between logical channels and transport channels from the UTRAN perspective.
Figure 6:
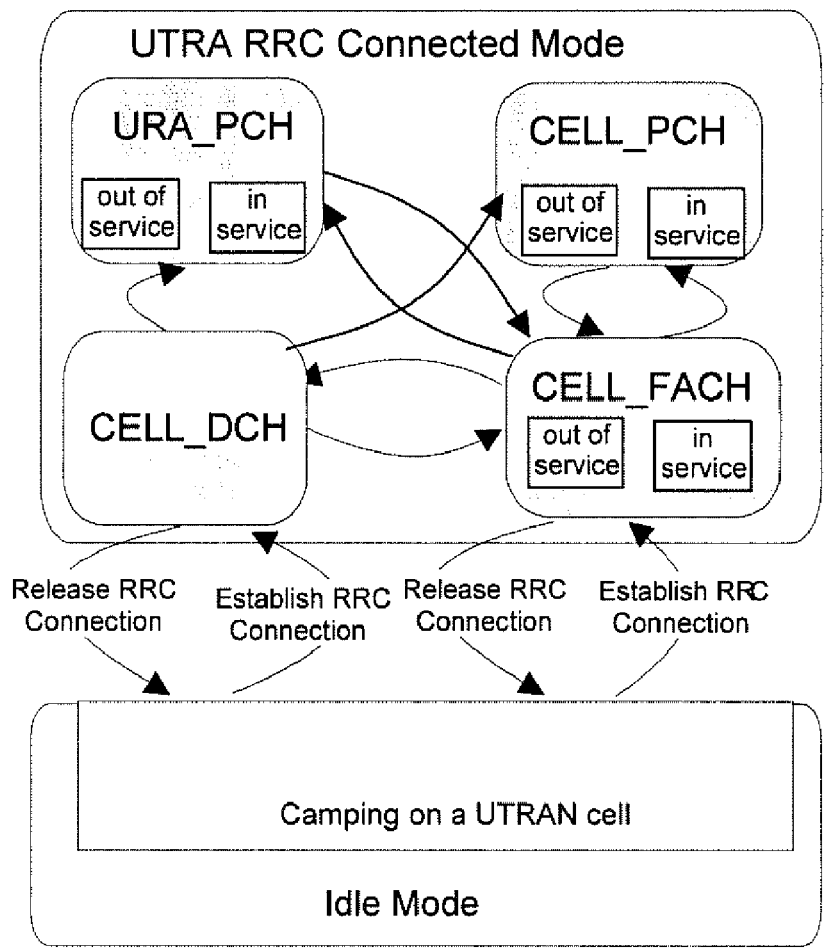
FIG. 6 illustrates possible UE state transitions.
Figure 7:
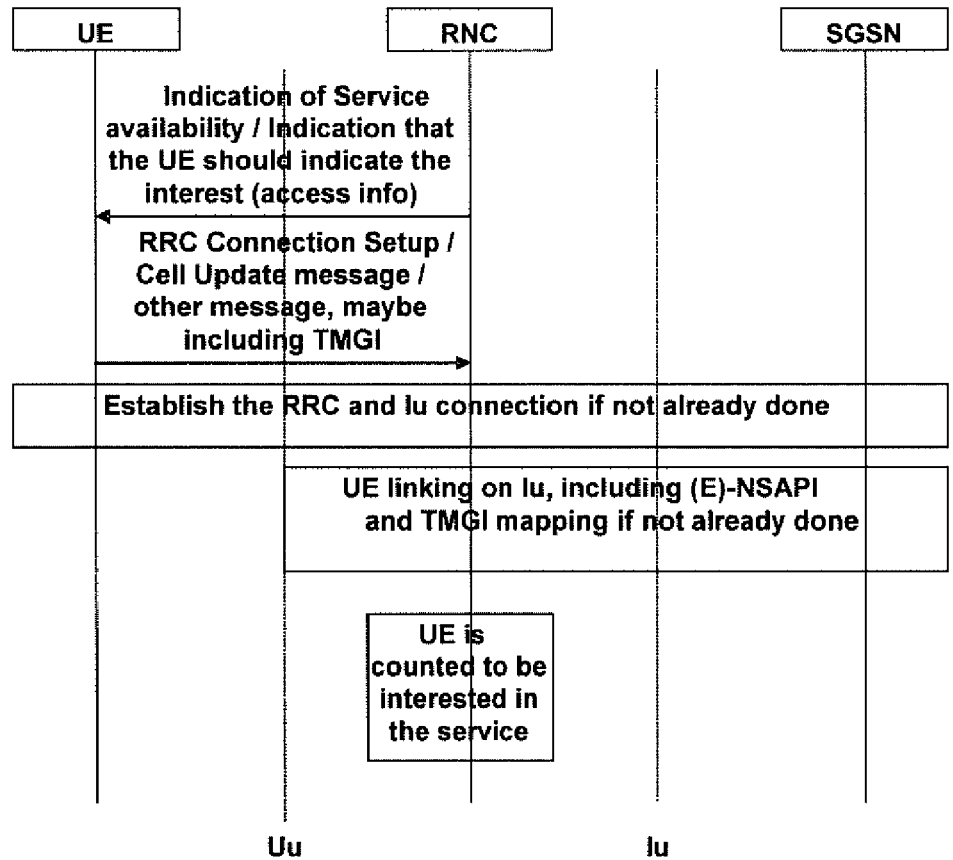
FIG. 7 illustrates a typical counting procedure.
Figure 8:
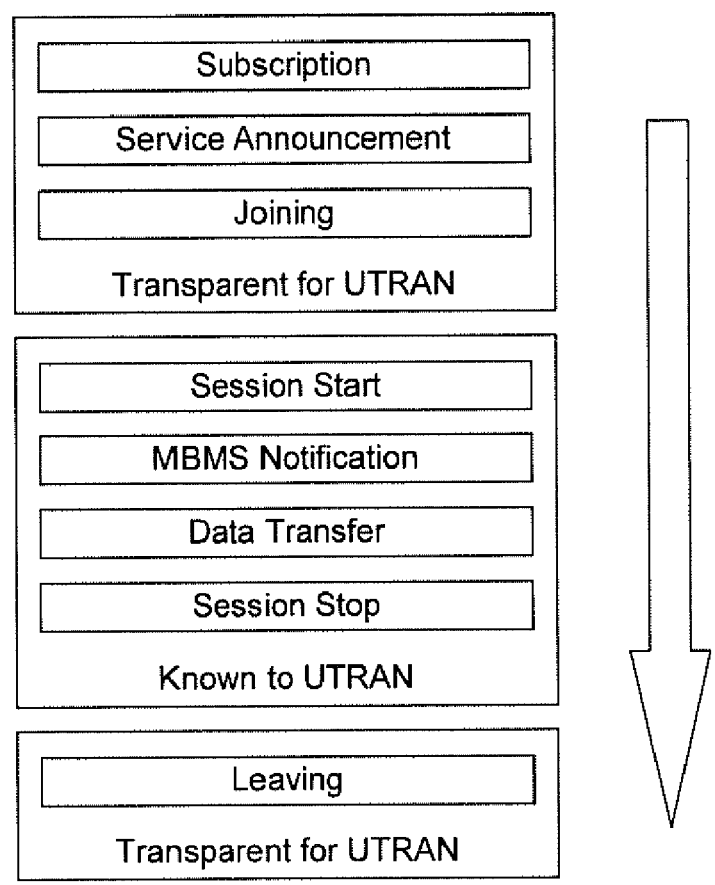
FIG. 8 is a block diagram of a process for providing a particular MBMS service using multicast mode.

FIG. 8 is a block diagram of a process for providing a particular MBMS service using multicast mode. This process has two general types of actions; transparent and nontransparent.

One transparent action relates to a situation in which a user desiring to receive a MBMS service will need to first subscribe to the desired MBMS service or services. A service announcement may provide the terminal with a list of possible MBMS services and related information. The user can then join these services, resulting in the user becoming a member of a multicast service group. If a user is not interested in a given MBMS service, the user can then leave the service such that the user is no longer a member of the multicast service group. These transparent actions can be achieved using any of a variety of different communication types (e.g., short message service (SMS), Internet communications, and the like), and do not necessarily require use of the UMTS system, for example.

Actions which are nontransparent to the UTRAN (i.e., actions which are known to the UTRAN) include session start, MBMS notification, data transfer, and session termination. For instance, the SGSN may inform the RNC about the start of a session. The RNC may then notify the various UEs of the multicast group that a given service has started so that such UEs may initiate the reception of the service. Once a UE has initiated reception of the multicast service, data transmission commences. At session termination, the SGSN indicates this action to the RNC, which in turn initiates session termination. Transmission of the service from the SGSN relates to the RNC providing a radio bearer service to convey the MBMS service data.

After the notification procedure, a number of procedures may be initiated between the UE, the RNC, and the SGSN in order to enable data transmission. Examples of such procedures include RRC connection establishment, connection establishment toward the packet switched domain, frequency layer convergence, counting, and the like.

It should be noted that reception of a MBMS service may be performed in parallel to the reception of other services (e.g., voice or video transmission on the circuit switched domain, SMS transfer on the circuit switched or packet switched domain, data transfer on the packet switched domain, or any signaling related to the UTRAN, packet switch domain, or circuit switch domain).

Figure 9:
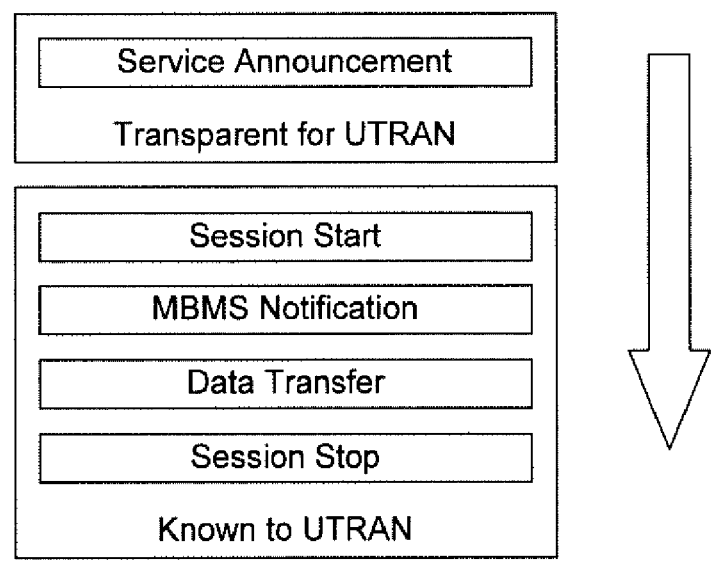
FIG. 9 is a block diagram of a process for providing broadcast services.

FIG. 9 is a block diagram of a process for providing broadcast services. In contrast to the multicast process of FIG. 8, the broadcast service of FIG. 9 depicts providing service announcement in a transparent manner. No subscription or joining is required for the broadcast service. Actions which are nontransparent for the broadcast services are similar to those in the multicast process of FIG. 8.

Another difference is that for multicast services, the UE may previously subscribe to the service such that the network is aware of UEs which are interested in a given service before the service actually starts. Conversely, in broadcast services, the network is not made aware of UEs which are interested in a service until the service starts.

If the network has determined that a service should be sent on a PtP bearer, and the service starts, the network will typically inform the UE that it should request the establishment of the PtP service. This is typically accomplished by sending a notification message to the UE, such as a MODIFIED SERVICES INFORMATION or MBMS UNMODIFIED SERVICES INFORMATION message, for example.

Figure 10:
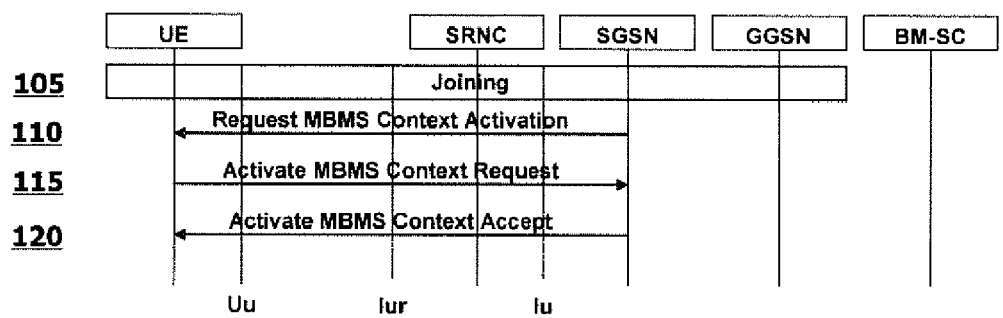
FIG. 10 provides an example of joining and MBMS context activation for a multicast service.

FIG. 10 provides an example of joining and MBMS context activation for a multicast service. Operation 105 includes the UE joining the multicast service, and in particular, the UE indicates to the GGSN that it wants to receive the multicast service. The GGSN checks the authorization with the BM-SC, and informs the SGSN on the joining procedure. Operation 110 relates to the SGSN sending the request MBMS context activation message to the UE. This message requests that the UE activate the service in the SGSN. Operation 115 shows the UE acknowledging the request MBMS context activation message and sending a MBMS context activation request message. This message typically includes, for example, a temporary mobile group identifier (TMGI), and an enhanced network service access point identifier (ENSAPI). The network confirms the MBMS context activation request message by sending an activate MBMS context accept message to the UE (operation 120).

At this point, the ENSAPI is effectively linked to a TMGI, and thus, there is no need to transmit the TMGI to the UE at the establishment of a PtP bearer. That is, the transmission of the ENSAPI at the PtP bearer establishment from the RNC to the UE is sufficient to identify the TMGI that has been linked to the ENSAPI in the earlier context establishment.

Figure 11:
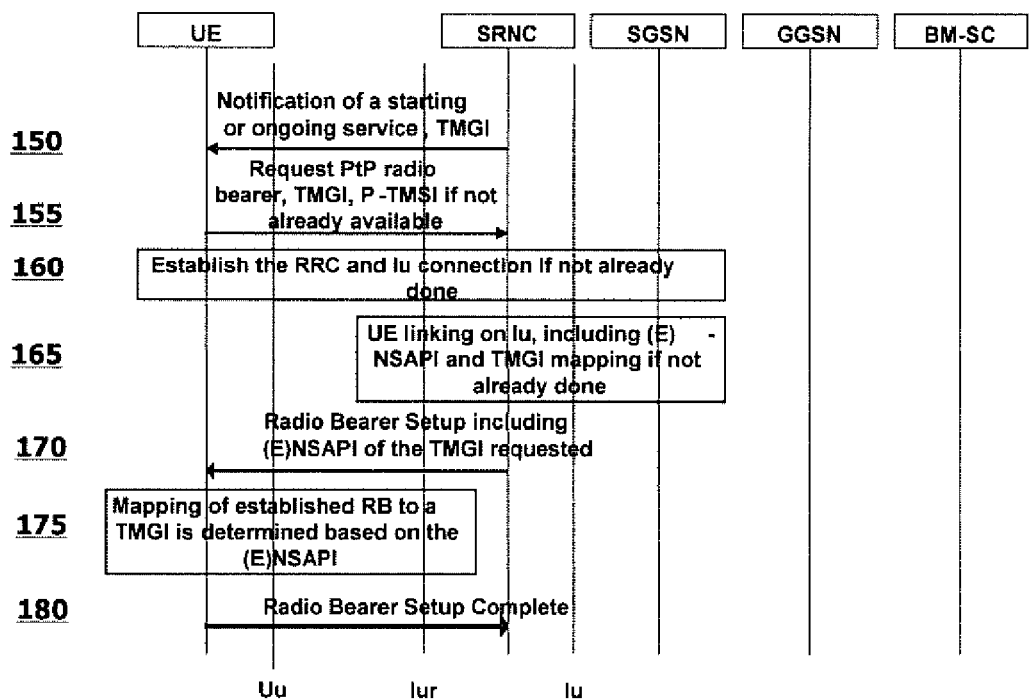
FIG. 11 provides an example of a PtP radio bearer setup for multicast services.

FIG. 11 provides an example of PtP radio bearer setup for multicast services. The serving RNC is shown informing the UE that a new or existing service is present. Typically, the TMGI or some representation of the TMGI is transmitted to the UE (operation 150). Because the TMGI includes the PLMN identification, the PLMN identification portion of the TMGI may be omitted if this identification is the same as that of one of the PLMN IDs of the network.

Operation 155 depicts the UE requesting a radio bearer setup. If the UE has not already established a connection to the Iu interface, the UE initiates this establishment in operation 160.

Operation 165 relates to the RNC exchanging linking information with the SGSN, such that for each service identified by the TMGI that the UE has subscribed, the RNC has an (E)NSAPI value available. This is desirable because the size of the TMGI value is typically much larger than the size of the (E)NSAPI. Operation 170 provides a radio bearer setup message which includes the (E)NSAPI and TMGI. Operation 175 includes mapping of the established radio bearer to the TMGI based upon the (E)NSAPI. In operation 180, the UE confirms the establishment with a radio bearer setup complete message transmitted to the SRNC.

FIG. 12 depicts an example of a typical network service access point identifier (NSAPI). As this figure illustrates, the NSAPI includes certain unused portions. In particular, only locations 5-15, of the 0-15 possible locations, are used. FIG. 13 depicts an example of a typical enhanced NSAPI, which is commonly used in the MBMS. The enhanced NSAPI shown in this figure is coded on 8 octets. From the available values 0-255, only values 128-255 are used for MBMS. Accordingly, the NSAPI and enhanced NSAPI may be similarly utilized and will be referred to herein as (E)NSAPI.

FIG. 14 depicts an example of a typical temporary mobile group identity (TMGI). A mobile counter code (MCC) and a mobile network code (MNC) collectively define a PLMN code. The PLMN code in a TMGI in many cases will be the same as the PLMN code of the network with which the UE has registered. Thus it is possible to omit the MCC and MNC (i.e., the PLMN in the case that it is the same as the PLMN of the network, or a PLMN that is listed in the network such as the case in shared networks).

In general, UE linking in a broadcast service (e.g., such as that which is illustrated in FIG. 11), is not utilized. Accordingly, if the network is to carry a MBMS broadcast service on a PtP bearer, the (E)NSAPI that is used in the radio bearer setup will not have been defined beforehand. A potential issue is that different UEs might be interested in different services, and thus, a fixed mapping from the (E)NSAPI to the TMGI is typically not used.

In accordance with various embodiments of the present invention, several general techniques for resolving the noted issue, among other issues, will now be described. A first technique includes adding the TMGI, or a representation of the TMGI, to a radio bearer setup message. This may be used to identify, for each radio bearer, whether the (E)NSAPI is used. This in turn permits the identification of the MBMS or other service that the radio bearer carries. This further permits the UE to identify the MBMS service transported in the radio bearer. However, this arrangement typically requires a significant increase of the message size because of the size of the TMGI.

A second technique includes the network indicating an (E)NSAPI along with each TMGI, or representation of the TMGI. This indication is typically sent to the UE in a notification message of a broadcast service. Some of the (E)NSAPI values are typically reserved for use as active broadcast services such that they are not used during the linking phase.

A third technique has the UE indicating a linking between the (E)NSAPI and the TMGI directly toward the RNC.

Figure 15:
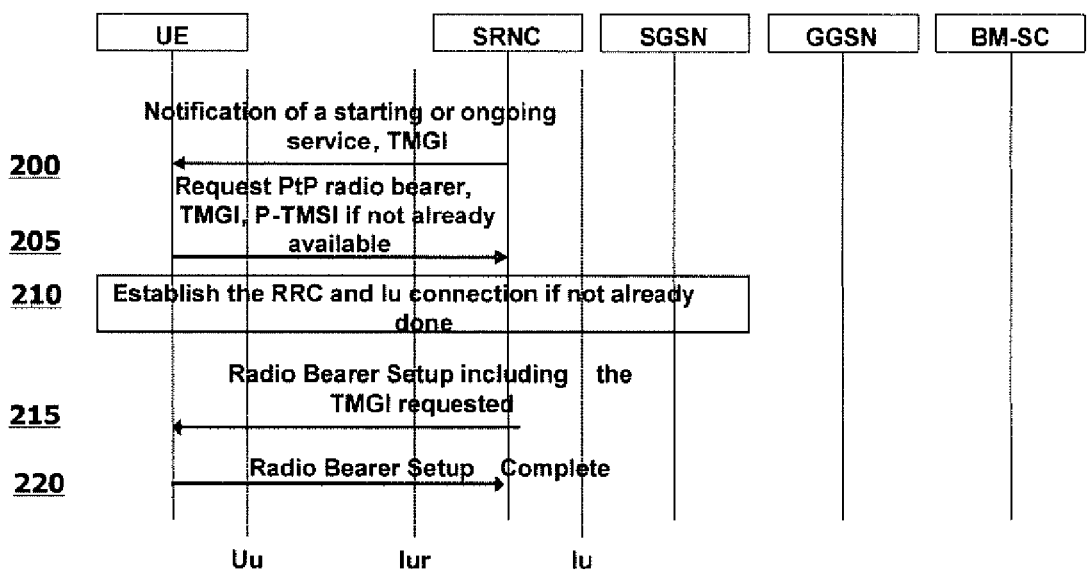
FIG. 15 depicts an example of a PtP radio bearer setup for broadcast services utilizing TMGI in a radio bearer setup message, in accordance with an embodiment of the present invention.

FIG. 15 depicts an example of a PtP radio bearer setup for broadcast services utilizing TMGI in a radio bearer setup message, in accordance with an embodiment of the present invention. Operation 200 includes informing the UE of the start of session of a MBMS service. This operation may further indicate that the service is to be sent on a PtP radio bearer. This may be accomplished using by the network transmitting a message such as, for example, a MODIFIED SERVICES INFORMATION or MBMS UNMODIFIED SERVICES INFORMATION message.

At operation 205 the UE requests a PtP bearer using a suitable message (e.g., cell update, RRC connection request message, MBMS modified service request, and the like) which includes the TMGI (or other identifier). Such a message is typically utilized to indicate to the serving RNC which service the UE would like to receive. If desired, the UE may initiate the establishment of an RRC and Iu connection if such processes have not previously been done (operation 210).

According to operation 215, the RNC initiates a radio bearer setup using a radio bearer setup message. According to one aspect of the present invention, this message may include the TMGI (or an identifier derived from the TMGI) which identifies the service which is to be carried by the radio beater. The radio bearer setup is now complete (operation 220). Interestingly, the UE can thus identify the service without using the (E)NSAPI. Note that (E)NSAPI is commonly included in the radio bearer setup message, even if such parameters are not used. It may therefore be useful to reuse the (E)NSAPI value.

Figure 16:
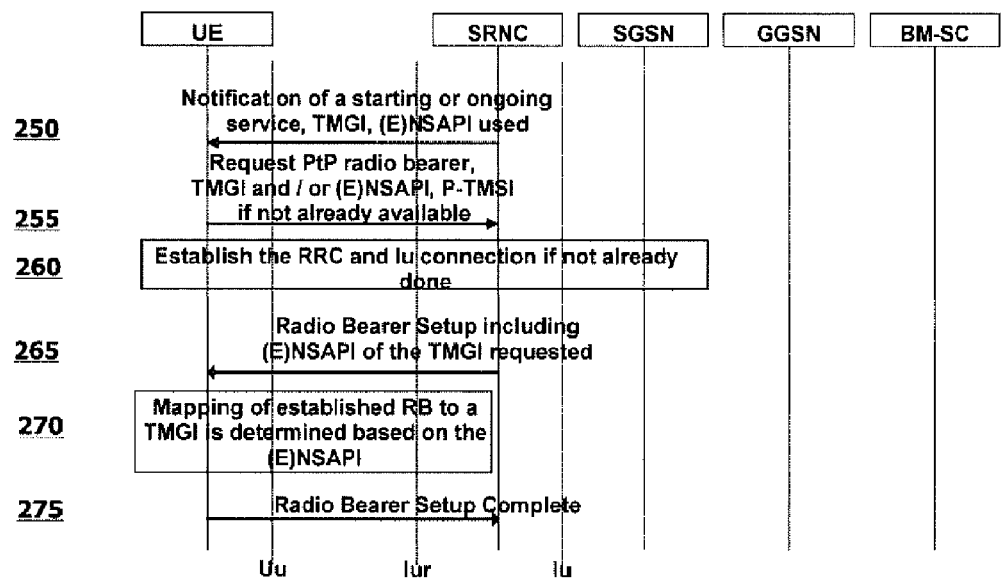
FIG. 16 depicts an example of a PtP radio bearer setup for broadcast services utilizing TMGI in the announcement, in accordance with an embodiment of the present invention.

FIG. 16 depicts an example of a PtP radio bearer setup for broadcast services utilizing TMGI in the announcement, in accordance with an embodiment of the present invention. Operation 250 includes informing the UE of the start of a session of a MBMS service. This operation may further include an indication that the service will be sent on a PtP bearer. If desired, the network allocates an (E)NSAPI value of a reserved set of values, or a value that is not yet used by the UE, for the MBMS broadcast service. The mapping between the (E)NSAPI value and the TMGI is typically valid as long as the broadcast service is active.

According to operation 255, the UE requests a PtP bearer using a suitable message or request which indicates that the UE is interested in receiving MBMS broadcast service on a PtP radio bearer. Such a request may be implemented using cell update, RRC connection request, MBMS modified service request message, and the like.

To indicate the service that the UE is interested in, a TMGI or a derived value may also be included in the request. Alternatively, if the (E)NSAPI has already been allocated, the (E)NSAPI may be used to identify the service requested by the UE. Yet another alternative relates to the scenario in which the UE has not yet received the (E)NSAPI. In such a scenario, the UE could indicate the TMGI and (E)NSAPI that would be allocated for that MBMS service.

Operation 260 relates to the UE initiating the establishment of an RRC and Iu connection, if such actions have not already been performed. Operation 265 specifies the RNC initiating the radio bearer setup using, for example, the radio bearer setup message. If desired, this message may include the (E)NSAPI that the network had previously sent to the UE or that the UE has indicated to the network in combination with the (E)TMGI. Operation 270 includes mapping of the established radio bearer to the TMGI based upon the (E)NSAPI. The UE can thus identify the service using the (E)NSAPI. If desired the UE may indicate the successful establishment of the radio bearer by sending a radio bearer setup complete message to the network (operation 275).

In accordance with further embodiments of the present invention, instead of including the TMGI value in a cell update message or RRC connection setup message, a MBMS short transmission identification may be calculated. Such calculations may be based on, for example, the order of the entries in the MBMS MODIFIED SERVICES INFORMATION and MBMS UNMODIFIED SERVICES INFORMATION messages.

The MBMS short transmission identification is typically used in the downlink. This is usually implemented to avoid repeating the complete TMGI listed in the MBMS MODIFIED SERVICES INFORMATION or MBMS UNMODIFIED SERVICES INFORMATION message sent on the MCCH channel when it needs to be listed in the MBMS ACCESS INFORMATION message (which is also sent on the MCCH channel). In that case, the UE may calculate the meaning of the MBMS short transmission identification sent in the MBMS ACCESS INFORMATION message by concatenating the TMGIs listed in the MBMS MODIFIED SERVICES INFORMATION and MBMS UNMODIFIED SERVICES INFORMATION. The value of the MBMS short transmission identification provides the entry of the TMGI in that list.

Thus, instead of including the TMGI listed in the uplink (e.g., via the cell update, RRC connection request, MBMS modified service request or any other message), the UE may include the entry of the TMGI in the list of the MBMS MODIFIED SERVICES INFORMATION message, or an entry of the list of TMGIs in the MBMS UNMODIFIED SERVICES INFORMATION message, in addition to the total number of TMGIs listed in the MBMS MODIFIED SERVICES INFORMATION message. Because the content of the MBMS MODIFIED SERVICES INFORMATION and MBMS UNMODIFIED SERVICES INFORMATION messages may change over time, it may be useful to additionally include a timing reference so that the network has knowledge of which version of the MODIFIED SERVICES INFORMATION and MBMS UNMODIFIED SERVICES INFORMATION the MBMS short transmission identification refers. These and other aspects will now be described with regard to FIG. 17.

Figure 17:
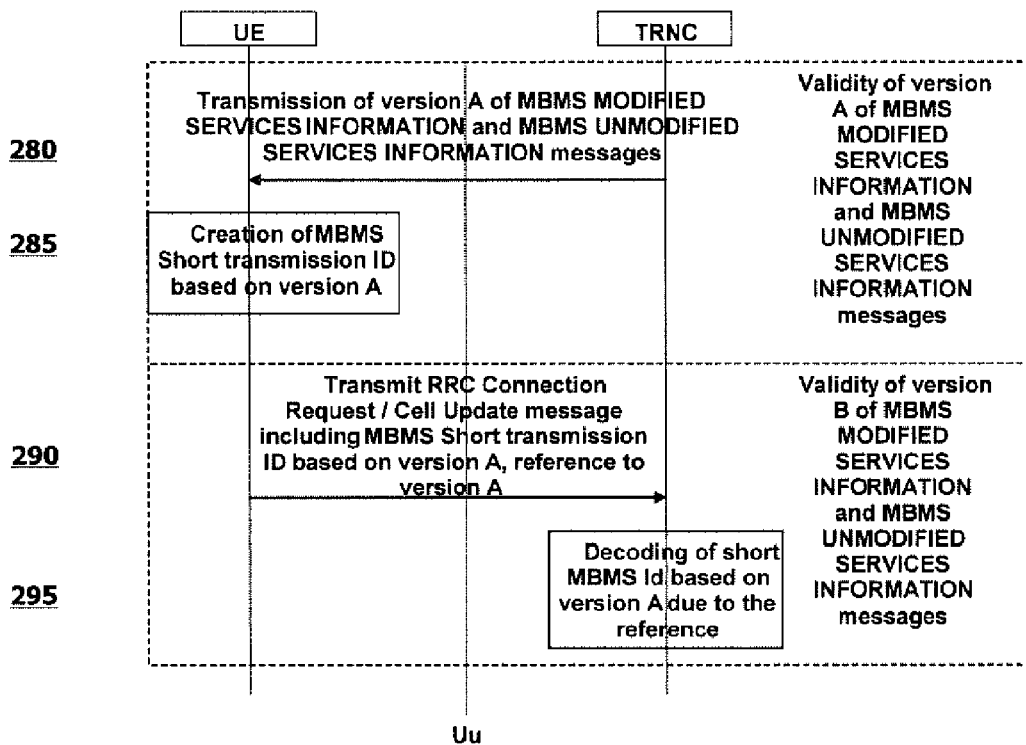
FIG. 17 depicts an example of a PtP radio bearer setup for broadcast services utilizing an MBMS short identifier for the indication of a service, in accordance with an embodiment of the present invention.

FIG. 17 depicts an example of a PtP radio bearer setup for broadcast services utilizing a MBMS short identifier for the indication of a service, in accordance with an embodiment of the present invention. Operation 280 includes the UE receiving MBMS modified and unmodified service information messages during a modification period (i.e., during a period in which the UE knows that the contents will not change). According to operation 285, the UE can then calculate the MBMS short transmission identification. In operation 290, the UE transmits an RRC connection request message or cell update message to the network. This message may include the MBMS short transmission identification. It is possible for a delay to be present in the transmission of this message, and thus, the MBMS modified and unmodified service information messages transmitted at the time where the RNC receives the message might be different compared to the MBMS modified and unmodified service information messages transmitted at the time where the UE has calculated the MBMS short transmission ID.

Operation 295 allows the RNC to decode the message based on the correct modification period. One technique for accomplishing this is to include a timing reference in the message. This timing reference indicates on which the MBMS modified and unmodified service information messages the MBMS short transmission ID has been created. Such a timing reference may include, for example, a system frame number (SFN), or portions of a SFN which are broadcast on BCH channels in the UMTS.

Figure 18:
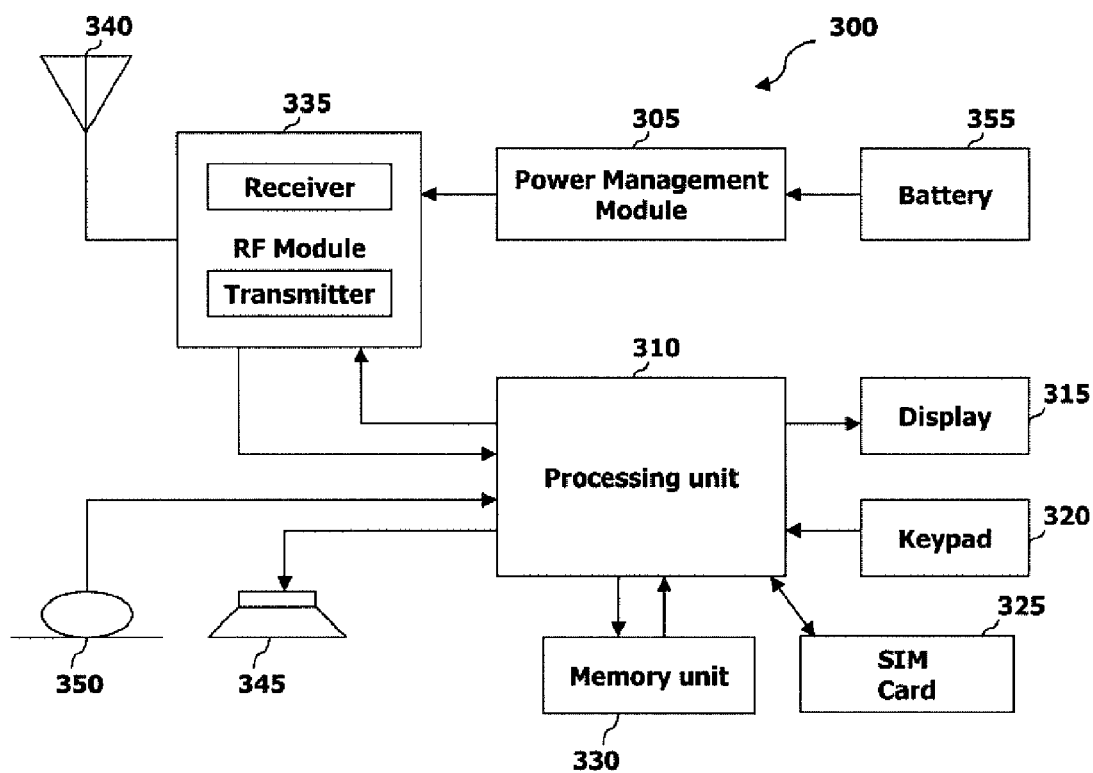
FIG. 18 is a block diagram of mobile communication device 300, which may be configured as a UE in accordance with embodiments of the present invention.

FIG. 18 is a block diagram of mobile communication device 300, which may be configured as a UE in accordance with embodiments of the present invention. Device 300 is illustrated, for example, as a mobile phone and may be configured to perform various methods described herein. The mobile communication device 300 includes a processing unit 310 such as a microprocessor or digital signal processor, RF module 335, power management module 305, antenna 340, battery 355, display 315, keypad 320, optional subscriber identify module (SIM) card 325, memory unit 330 such as flash memory, ROM or SRAM, speaker 345 and microphone 350.

A user enters instructional information, such as a telephone number, for example, by pushing the buttons of keypad 320 or by voice activation using microphone 350. Processing unit 310 receives and processes the instructional information to perform the appropriate function, such as to dial the telephone number. Operational data may be retrieved from memory unit 330 to perform the function. Furthermore, processing unit 310 may display the instructional and operational information on display 315 for the user's reference and convenience.

Processing unit 310 issues instructional information to RF section 335, to initiate communication, for example, transmit radio signals comprising voice communication data. RF section 335 comprises a receiver and a transmitter to receive and transmit radio signals. Antenna 340 facilitates the transmission and reception of radio signals. Upon receiving radio signals, RF module 335 may forward and convert the signals to baseband frequency for processing by processing unit 310. The processed signals would be transformed into audible or readable information outputted via speaker 345, for example.

Processing unit 310 is adapted to perform various methods disclosed herein, among other operation. It will be apparent to one skilled in the art that mobile communication device 300 may be readily implemented using, for example, processing unit 310 or other data or digital processing device, either alone or in combination with external support logic. Although the present invention is described in the context of mobile communication, the present invention may also be used in any wireless communication systems using mobile devices, such as PDAs and laptop computers equipped with wireless communication capabilities. Moreover, the use of certain terms to describe the present invention should not limit the scope of the present invention to certain type of wireless communication system, such as UMTS. The present invention is also applicable to other wireless communication systems using different air interfaces and/or physical layers, for example, TDMA, CDMA, FDMA, WCDMA, and the like.

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor.

The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The logic implementation shown in the figures described specific operations as occurring in a particular order. In alternative implementations, certain logic operations may be performed in a different order, modified or removed and still implement preferred embodiments of the present invention. Moreover, steps may be added to the above described logic and still conform to implementations of the invention.

The foregoing embodiments and advantages are merely exemplary and are not to be construed as limiting the present invention. The present teaching can be readily applied to other types of apparatuses and processes. The description of the present invention is intended to be illustrative, and not to limit the scope of the claims. Many alternatives, modifications, and variations will be apparent to those skilled in the art.

What is claimed is:

1. A method for decoding a short transmission identifier in a network that supports multimedia broadcast/multicast services (MBMS), the method comprising:
    transmitting, from the network to a user equipment (UE), service information containing MBMS modified services information and MBMS unmodified services information related to MBMS services, the service information comprising at least one service identifier,
    wherein the MBMS services have two Service Types including a Multicast Service Type and a Broadcast Service Type, and
    wherein the UE selects an MBMS service among the MBMS services, wherein the selected MBMS service is of the Broadcast Service Type using an MBMS point-to-point radio bearer;
    receiving, by the network, at least one short transmission identifier and version information, wherein the at least one short transmission identifier references at least one service identifier of the service information, and wherein the version information is associated with a version of the service information; and
    decoding the least one short transmission identifier based upon the version information to identify the at least one service identifier.

2. The method according to claim 1, further comprising:
    determining the version of the service information using a timing reference associated with the service information.

3. The method according to claim 2, wherein the timing reference is determined based upon a system frame number associated with the service information.

4. The method according to claim 1, wherein the service information comprises a list of service identifiers arranged by appending service identifiers received in an MBMS unmodified services information message to service identifiers received in an MBMS modified services information message.

5. The method according to claim 4, wherein the at least one short transmission identifier corresponds to a location of the at least one service identifier within the list of service identifiers.

6. The method according to claim 1, further comprising:
    transmitting, to the UE, service information comprising at least one service identifier; and
    receiving, by the network, the at least one short transmission identifier along with timing information associated with a time of receipt of the service information by the UE, wherein the at least one short transmission identifier references at least one service identifier of the service information.

7. The method according to claim 1, wherein the service identifier is related to a temporary mobile group identifier (TMGI).

8. The method according to claim 2, wherein at least the version or the version information relates to a correct modification period for a particular MBMS service.

* * * * *